(12) United States Patent
Shi et al.

(10) Patent No.: US 8,456,966 B1
(45) Date of Patent: Jun. 4, 2013

(54) METHOD AND SYSTEM FOR ENHANCING OPTICAL EFFICIENCY FOR AN EAMR HEAD

(75) Inventors: Zhong Shi, Dublin, CA (US); Shing Lee, Fremont, CA (US); Hongxing Yuan, San Ramon, CA (US); Rabee M. Ikkawi, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 252 days.

(21) Appl. No.: 12/971,754

(22) Filed: Dec. 17, 2010

(51) Int. Cl.
*G11B 11/00* (2006.01)

(52) U.S. Cl.
USPC .................... 369/13.33; 369/13.13

(58) Field of Classification Search
USPC .......... 369/13.33, 13.13, 13.32, 13.02, 13.17, 369/112.09, 112.14, 112.21, 112.27, 300; 360/59; 385/129, 31, 88–94; 29/603.07–603.27; 250/201.3, 201.5
See application file for complete search history.

(56) References Cited

U.S. PATENT DOCUMENTS

| | | | |
|---|---|---|---|
| 7,151,738 B2 | 12/2006 | Peng | |
| 7,330,404 B2 | 2/2008 | Peng | |
| 7,359,599 B2 | 4/2008 | Matsumoto | |
| 7,649,677 B2 | 1/2010 | Jin | |
| 8,076,246 B2 * | 12/2011 | Tanaka et al. | 438/692 |
| 8,170,389 B1 * | 5/2012 | Komura et al. | 385/129 |
| 2007/0115787 A1 | 5/2007 | Itagi | |
| 2007/0159720 A1 | 7/2007 | Sohn | |
| 2007/0165495 A1 | 7/2007 | Lee | |
| 2009/0052827 A1 | 2/2009 | Durfee | |
| 2009/0188891 A1 | 7/2009 | Tanaka | |
| 2009/0269007 A1 | 10/2009 | Itagi | |
| 2010/0046083 A1 | 2/2010 | Peng | |
| 2010/0061199 A1 | 3/2010 | Hirata | |
| 2010/0119194 A1 | 5/2010 | Seigler | |
| 2010/0163521 A1 | 7/2010 | Balamane | |
| 2010/0165499 A1 | 7/2010 | Stipe | |
| 2010/0165822 A1 | 7/2010 | Balamane | |
| 2011/0103201 A1 * | 5/2011 | Peng et al. | 369/13.24 |

OTHER PUBLICATIONS

Sendur, et al., "Near-Field Radiation from a Ridge Waveguide Transducer in the Vicinity of a Solid Immersion Lens", Physical Review Letters 94, 043901 (2005), 4 pages.
W. A. Challener, etc., Heat-assisted Magnetic Recording by a Near-field Transducer with Efficient Optical Energy Transfer, Nature Photonics, Mar. 22, 2009, pp. 220-224, vol. 3, Macmillan Publishers Ltd., www.nature.com/ naturephotonics.

(Continued)

*Primary Examiner* — Tan X Dinh

(57) ABSTRACT

A method and system for providing an EAMR transducer and a waveguide used therein are described. The EAMR transducer is coupled with a laser that provides energy. The EAMR transducer also has an ABS that resides in proximity to a media during use. The EAMR transducer includes a waveguide, a write pole to write to a region of the media, coil(s) for energizing the write pole, and a near field transducer (NFT) proximate to the ABS for focusing the energy onto the media. The waveguide includes a mode shift compensator, first and second cladding layers, and a core between the cladding layers. The core directs energy from the laser toward the ABS and has a core index of refraction. The core is also between the mode shift compensator and the NFT. The mode shift compensator has a mode shift compensator index of refraction less than the core index of refraction.

24 Claims, 4 Drawing Sheets

OTHER PUBLICATIONS

T. Matsumoto, et al., Thermally Assisted Magnetic Recording on a Bit-Patterned Medium by Using a Near-field Optical Head with a Beaked Metallic Plate, Applied Physics Letters, 2008, vol. 93, 93-031108-1-93-031108-3 (2008).

T. Matsumoto, et al., Highly Efficient Probe with a Wedge-shaped Metallic Plate for High Density Near-field Optical Recording, Journal of Applied Physics, Apr. 15, 2004, 3901-3906, vol. 95.

H. Hatano et al., Plano-Convex Solid Immersion Mirror with a Small Aperture for Near-field Optical Data Storage, Optical Review, 2002, pp. 66-69, vol. 9, No. 2.

L Sun, et al., Low-loss Subwavelength Metal C-aperture Waveguide, Optics Letters, Dec. 15, 2006, pp. 3606-3608, vol. 31, No. 24.

B. C. Stipe, et al., Ridge Waveguide for Thermally Assisted Recording-optimization, Scaling, and Wavelength Dependence, 572, Intermag 2006.

K. Takano, et al., Automatic Design Optimization of Plasmon Antenna for Thermally Assisted Magnetic Recording IEEE Transactions on Magnetics, Oct. 2009, pp. 3604-3607, vol. 45, No. 20.

W. A. Challener, et al., Near-field Optics for Heat-assisted Magnetic Recording (Experiment, Theory, and Modeling), Book chapter of Modeling and Numerical Simulations II edited by M. Schlesinger, p. 53-111, 2009.

* cited by examiner

METHOD AND SYSTEM FOR ENHANCING OPTICAL EFFICIENCY FOR AN EAMR HEAD

BACKGROUND

FIG. 1 depicts a portion of a conventional energy assisted magnetic recording (EAMR) transducer 10 as well as recording media 16. For clarity, FIG. 1 is not to scale. The conventional EAMR transducer 10 is used in writing to the recording media 16. The EAMR transducer 10 receives light, or energy, from a conventional laser (not shown in FIG. 1). The conventional EAMR transducer 10 includes a conventional waveguide 20, which directs the light toward the media 16. The conventional waveguide typically includes a core 24 and cladding 22 and 26. Also shown are a conventional shield 12, a conventional pole 14, and a conventional near-field transducer (NFT) 30. Light from a laser (not shown) is incident on the grating (not shown), which couples light to the waveguide 20. Light is guided by the conventional waveguide 20 to the NFT 30 near the air-bearing surface (ABS). The light interacts with the NFT 30, which absorbs part of the optical energy and forms very strong localized electromagnetic field. When the localized electromagnetic field is close enough to the recording media 16, the recording media also absorbs part of the localized electromagnetic field and is heated. The pole 14 is then used to write to the heated region.

Although the conventional EAMR transducer 10 may function, it may be inefficient. The media recording efficiency is the ratio of the energy being absorbed by the magnetic recording medium to the incident optical energy. In the conventional EAMR transducer, the media absorption efficiency is on the order of a few percent at most. This low efficiency may be due to a number of factors. For example, there may be losses when light is coupled from the laser to the conventional waveguide 20, losses during propagation through the waveguide 20, a relatively weak interaction between the conventional waveguide 20 and the NFT 30, and the evanescent nature of localized electromagnetic field generated by the NFT 30. Efficiency of the EAMR transducer 10 is adversely affected.

Accordingly, what is needed is a system and method for improving efficiency and performance of the EAMR transducer.

BRIEF SUMMARY OF THE INVENTION

A method and system for providing an EAMR transducer and a waveguide used therein are described. The EAMR transducer is coupled with a laser that provides energy to the EAMR transducer. The EAMR transducer has an ABS configured to reside in proximity to a media during use. The EAMR transducer includes a write pole configured to write to a region of the media, at least one coil for energizing the write pole, and a near field transducer (NFT) proximate to the ABS. The NFT is for focusing the energy onto the region of the media. The EAMR transducer includes the waveguide. The waveguide includes first and second cladding layers and a core residing between the first and second cladding layers. The core is configured to direct the energy from the laser toward the ABS and has a core index of refraction. The waveguide also includes a mode shift compensator. The core is between the mode shift compensator and the NFT. The mode shift compensator has a mode shift compensator index of refraction less than the core index of refraction.

DETAILED DESCRIPTION OF THE EMBODIMENTS OF THE INVENTION

Figure 1:
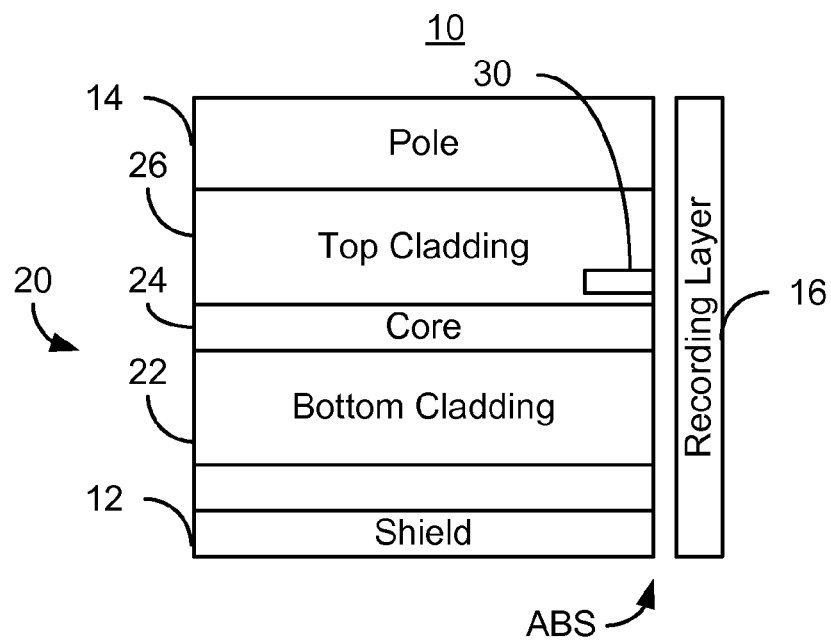
FIG. 1 is a diagram depicting a conventional EAMR transducer.
Figure 2:
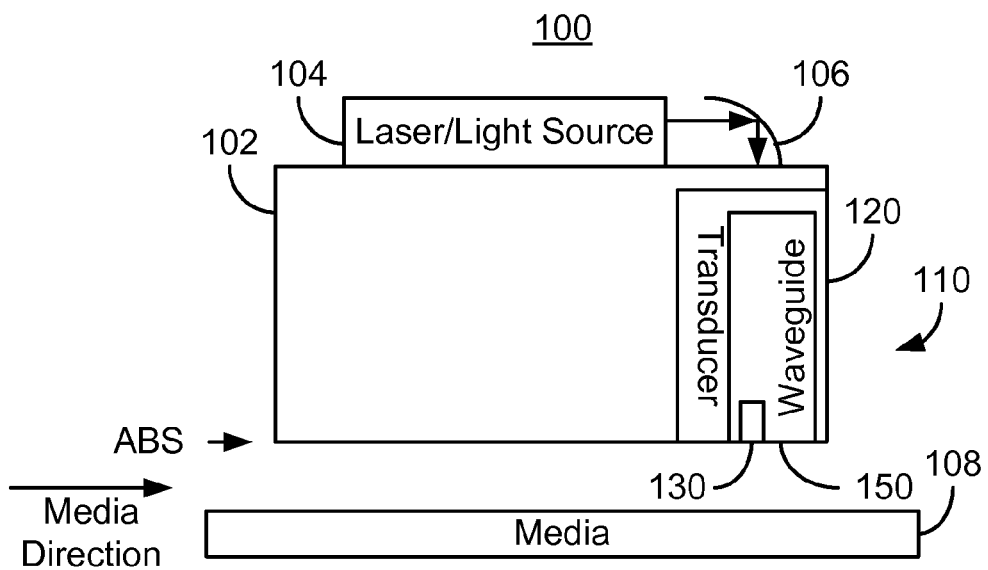
FIG. 2 is a diagram depicting an exemplary embodiment of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104, optional mirror or other optics 106 for redirecting light from the laser 104, media 108, and an EAMR head 110. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The laser 104 may also be oriented differently and/or optically coupled with the EAMR transducer 120 in another manner. The media 108 may include multiple layers, which are not shown in FIG. 2 for simplicity.

The EAMR head 110 includes an EAMR transducer 120. The EAMR head 110 may also include a read transducer (not shown in FIG. 2). The read transducer may be included if the EAMR head 110 is a merged head. The EAMR transducer 120 includes an NFT 130 and at least one waveguide 150. The EAMR transducer 120 also typically includes a pole, shield(s), coil(s) and other components for magnetically writing to the media 108.

Figure 3:
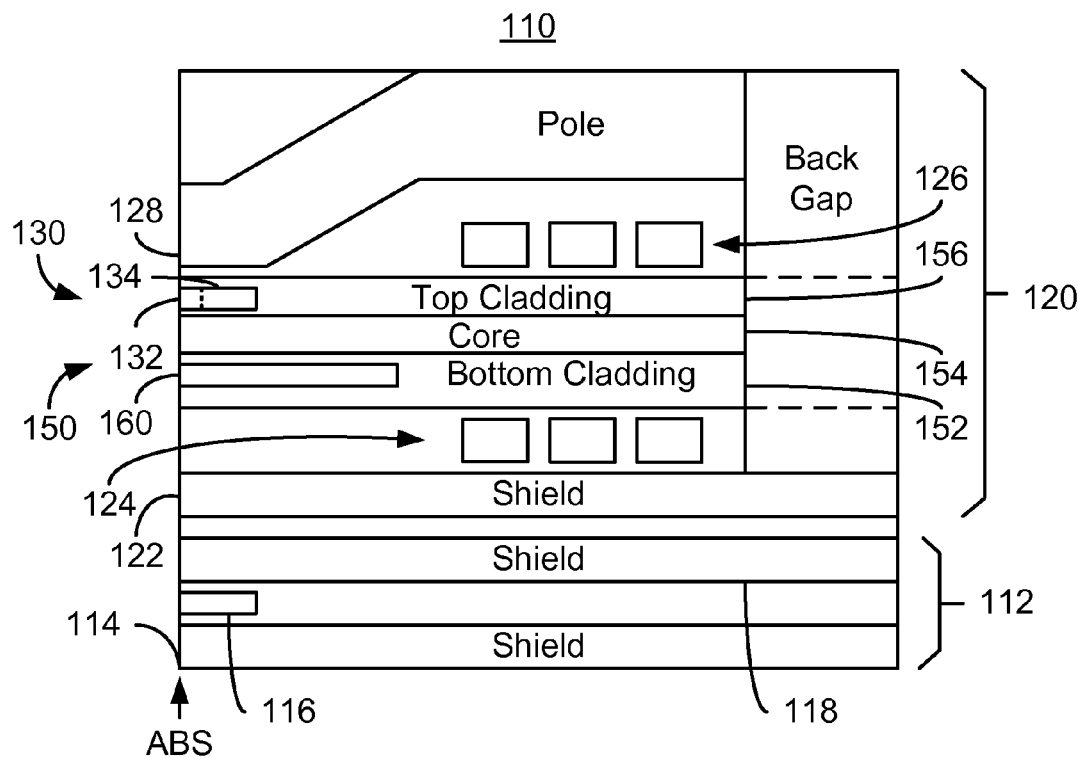
FIG. 3 is a diagram depicting a side view of an exemplary embodiment of an EAMR transducer.

FIG. 3 is a diagram depicting another exemplary embodiment of a portion of the EAMR head 110 shown in FIG. 2. Consequently, analogous components are labeled similarly. For simplicity, FIG. 3 is not to scale. In addition, portions of the EAMR transducer 120 may be omitted in FIG. 3. For example a grating that may be used to couple light from the laser 104 into the EAMR transducer 120 is not shown in FIG. 3. In addition to the EAMR transducer 120, optional read transducer 112 is also shown. The read transducer 112 includes shields 114 and 118 as well as read sensor 116. In other embodiments, the read transducer 112 may be omitted.

The EAMR transducer 120 shown includes a shield 122, coils 124 and 126, pole 128, NFT 130, and waveguide 150. The NFT 130 may include a disk portion 134 and a pin portion 132. However, in another embodiment, another type of NFT 130 may be used. The NFT 130 is in proximity to the ABS and is used to focus light from the laser 104 onto the media 108.

The waveguide 150 includes cladding layers 152 and 156, core 154, and mode shift compensator 160. The waveguide 150 directs the energy from the laser 104 toward the ABS.

More specifically, the core 154 directs energy from the laser 104 (not shown in FIG. 3) toward the NFT 130. The core 154 has an index of refraction and may include materials such as $Ta_2O_5$, $TiO_2$, $Si_3N_4$. The core 154 is configured to support the desired mode(s) of light energy in the waveguide 150. The cladding layers 152 and 156 typically have lower indices of refraction than the core 154. For example, the cladding layers 152 and 156 may include materials such as aluminum oxide.

The waveguide 150 also includes the mode shift compensator 160. The core resides between the mode shift compensator 160 and the NFT 130. The mode shift compensator 160 is shown as extending partially along the core 160 and further from the ABS than the NFT 130. However, in other embodiments, the mode shift compensator 160 extends along the entire length of the core 160 perpendicular to the ABS. In still other embodiments, the mode shift compensator 160 may reside entirely under the NFT 130. In the embodiment shown, the mode shift compensator 160 is spaced apart from the core 154. However, in other embodiments, the mode shift compensator 160 adjoins the core 154. The mode shift compensator 160 also has a mode shift compensator index of refraction less than the core index of refraction. In some embodiments, the mode shift compensator 160 may be a dielectric having a lower index of refraction than the core 154. For example, in some embodiments the dielectric layer includes at least one of $SiO_2$, $MgF_2$, $CaF_2$, and $BaF_2$. In other embodiments, the mode shift compensator 160 may be a metal having a lower index of refraction than the core 154. For example, the metal layer may include at least one of Au, Ag, Cu, and Al.

In another embodiment, the mode shift compensator may include both a metal and a dielectric. Further, the mode shift compensator 160 may have in index of refraction that is lower than the index of refraction of the cladding layer 152. Similarly, the mode shift compensator 160 may have an index of refraction less than that of the cladding layer 156.

The mode shift compensator 160 is configured to compensate for the presence of the NFT 130. The NFT 130 is typically a metal such as Au or Ag. As such, the NFT 130 has an index of refraction that is different from, and typically lower than, the index of refraction of the core 154 and cladding 156. Without more, the mode(s) of light energy supported by the core 154 of the waveguide 150 would be shifted away from the NFT 130 and toward the bottom cladding 152. As a result, the bottom cladding 152 could carry a portion of the energy from the laser 104 instead of the core 154. However, the mode shift compensator 160 also has a lower index of refraction than the core 154. In some embodiments, the mode shift compensator 160 also has a lower index of refraction than the surrounding cladding layer(s) 152 and/or 156. Thus, the combination of the mode shift compensator 160 and the bottom cladding 152 is more similar to the combination of the NFT 130 and the top cladding 156. The mode shift compensator 160 may thus be considered to make the waveguide 150 more symmetric around the core 152. Consequently, the mode(s) carried by the waveguide 150 may be shifted back toward the NFT 130 and, therefore, the core 154. Stated differently, more of the mode(s) for which the waveguide 150 is configured are confined to the core 154. The mode shift compensator 160 may at least partially compensate for a shift in the mode out of the core 154. Consequently, the core 154 may be better able to couple energy from the laser 104 to the NFT 130. More of the energy from the laser 104 may thus be coupled into the media 104. The optical efficiency of the waveguide 150, and thus the NFT 130 may be improved. As a result, the efficiency of the EAMR transducer 110 may be enhanced.

Figure 4:
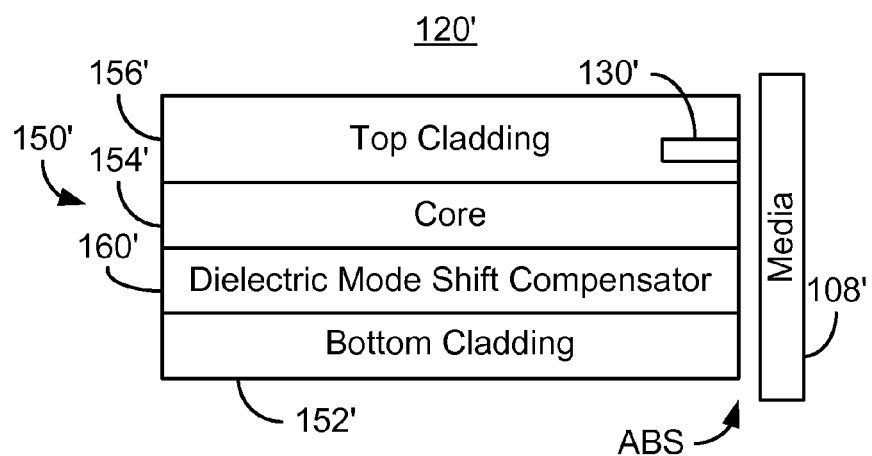
FIG. 4 is a diagram depicting an exemplary embodiment of a waveguide in an embodiment of the EAMR transducer.

FIG. 4 is a diagram depicting an exemplary embodiment of a waveguide 150' in an embodiment of the EAMR transducer 120'. The waveguide 150 and EAMR transducer are analogous to the waveguide 150 and EAMR transducer 120, respectively. Consequently, analogous components are labeled similarly. The EAMR transducer 120' may thus be part of a head and disk drive analogous to the head 110 and disk drive 100, respectively. For simplicity, FIG. 4 is not to scale. In addition, portions of the EAMR transducer 120' may be omitted in FIG. 4. For example a grating that may be used to couple light from the laser 104 into the EAMR transducer 120 is not shown in FIG. 4. Also shown is recording media 108'.

Waveguide 150' includes core 154', bottom cladding 152', and top cladding 156'. The NFT 130' is also shown as residing proximate to the core 154'. In addition, the NFT 130' is shown as residing in the top cladding 156'. The waveguide 150' also includes mode shift compensator 160' that includes a dielectric layer. In the embodiment shown, the mode shift compensator 160' is composed of a dielectric layer. In the embodiment shown, the mode shift compensator 160' adjoins the core 154'. The mode shift compensator 160 may be a dielectric having a lower index of refraction than the core 154. In some embodiments, the dielectric also has a lower index of refraction than the cladding 152' and/or 156'. For example, in some embodiments the dielectric layer includes at least one of $SiO_2$, $MgF_2$, $CaF_2$, and $BaF_2$. Because the mode shift compensator 160' is a dielectric, optical transmission losses may be substantially reduced or eliminated. As a result, the mode shift compensator 160' may extend along the length of the core 154' perpendicular to the ABS. This embodiment is depicted in FIG. 4. However, in other embodiments, the mode shift compensator 160' may extend only partially along the length of the core 154' perpendicular to the ABS.

The waveguide 150' is analogous to the waveguide 150. The waveguide 150' thus shares the benefits of the waveguide 150. More specifically, the mode shift compensator 160' is configured to compensate for the presence of the NFT 130'. The mode shift compensator 160' has a lower index of refraction than the core 154'. Consequently, the mode(s) carried by the waveguide 150' are better confined to the core 154'. Therefore, the core 154' may be better able to couple energy from the laser 104 to the NFT 130'. More of the energy from the laser 104 may thus be coupled into the media 104. The optical efficiency of the waveguide 150', and thus the EAMR transducer 120' may be improved. Further, the mode shift compensator 160' is a dielectric and, therefore, lossless. The optical efficiency of the waveguide 150' may thus be further improved. As a result, the efficiency of the EAMR transducer may be enhanced.

Figure 5:
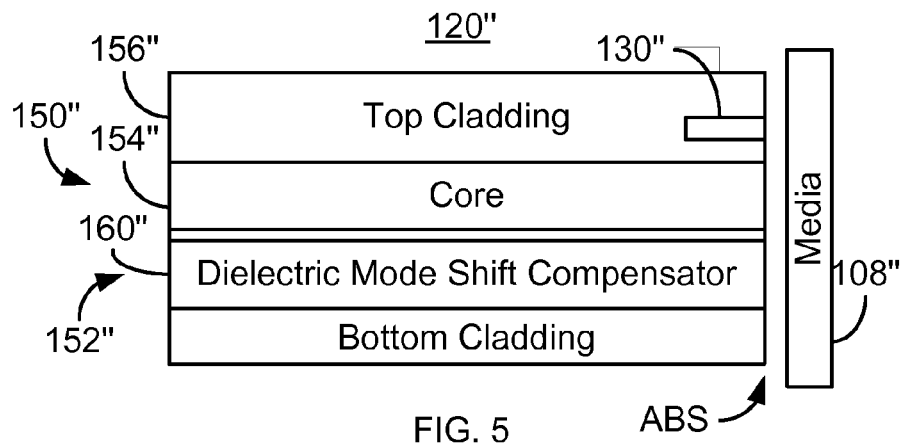
FIG. 5 is a diagram depicting another exemplary embodiment of a waveguide in an embodiment of the EAMR transducer.

FIG. 5 is a diagram depicting an exemplary embodiment of a waveguide 150" in an embodiment of the EAMR transducer 120". The waveguide 150" and EAMR transducer 120" are analogous to the waveguide 150 and EAMR transducer 120, respectively. Consequently, analogous components are labeled similarly. The EAMR transducer 120" may thus be part of a head and disk drive analogous to the head 110 and disk drive 100, respectively. For simplicity, FIG. 5 is not to scale. In addition, portions of the EAMR transducer 120" may be omitted in FIG. 5. For example a grating that may be used to couple light from the laser 104 into the EAMR transducer 120 is not shown in FIG. 5. Also shown is recording media 108".

Waveguide 150" includes core 154", bottom cladding 152", and top cladding 156". The NFT 130" is also shown as residing proximate to the core 154". In addition, the NFT 130" is shown as residing in the top cladding 156". The waveguide 150" is analogous to the waveguide 150'. Thus, the mode shift compensator 160" is analogous to the mode shift compensator 160'. However, the mode shift compensator 160' does not adjoin the core 154". Instead, a small portion of the bottom cladding 152" resides between the core 154" and the mode shift compensator 160". However, the waveguide 150" still shares the benefits of the waveguide 150'. In particular, the mode shift compensator 160" is configured to compensate for the presence of the NFT 130". Consequently, the mode(s) carried by the waveguide 150" are better confined to the core 154". Thus, the core 154' may be better able to couple energy from the laser 104 to the NFT 130'. The optical efficiency of the waveguide 150", and thus the NFT 130" may be improved. Further, the mode shift compensator 160" is a dielectric and, therefore, lossless. The optical efficiency of the waveguide 150" may be further improved.

Figure 6:
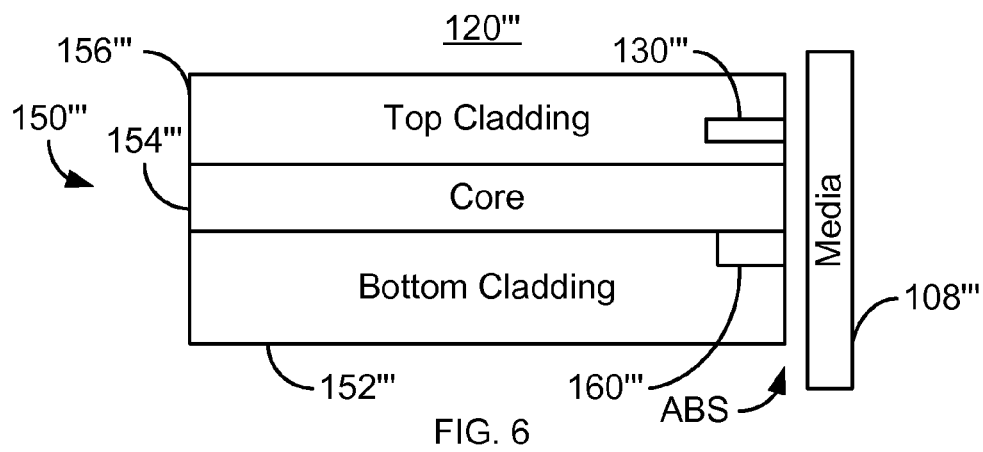
FIG. 6 is a diagram depicting another exemplary embodiment of a waveguide in an embodiment of the EAMR transducer.

FIG. 6 is a diagram depicting an exemplary embodiment of a waveguide 150''' in an embodiment of the EAMR transducer 120'''. The waveguide 150''' and EAMR transducer 120''' are analogous to the waveguide 150 and EAMR transducer 120, respectively. Consequently, analogous components are labeled similarly. The EAMR transducer 120''' may thus be part of a head and disk drive analogous to the head 110 and disk drive 100, respectively. For simplicity, FIG. 6 is not to scale. In addition, portions of the EAMR transducer 120''' may be omitted in FIG. 6. For example a grating that may be used to couple light from the laser 104 into the EAMR transducer 120 is not shown in FIG. 6. Also shown is recording media 108'''.

Waveguide 150''' includes core 154''', bottom cladding 152''', and top cladding 156". The NFT 130''' is also shown as residing proximate to the core 154'''. In addition, the NFT 130''' is shown as residing in the top cladding 156'''. The waveguide 150''' also includes mode shift compensator 160''' that includes a metallic layer. In some embodiments, the mode shift compensator 160' may be composed of a metal having a lower index of refraction than the core 154. For example, the metal layer may include at least one of Au, Ag, Cu, and Al. Because the mode shift compensator 160''' includes a metal layer, the modes shift compensator 160''' may result in losses. As a result, the mode shift compensator 160''' may extend not farther from the ABS than the NFT 130'''. Further, in some embodiments, the mode shift compensator 160''' may not extend along the ABS in the direction perpendicular to the page any further than the NFT 130'''.

The waveguide 150''' is analogous to the waveguides 150, 150', and 150". The waveguide 150'''' thus shares the benefits of the waveguides 150, 150', and 150". More specifically, the mode shift compensator 160''' is configured to compensate for the presence of the NFT 130'''. Consequently, the mode(s) carried by the waveguide 150''' are better confined to the core 154'''. Thus, the core 154''' may be better able to couple energy from the laser 104 to the NFT 130'''. The optical efficiency of the waveguide 150''' may be improved. As a result, the efficiency of the EAMR transducer 120''' may be enhanced.

Figure 7:
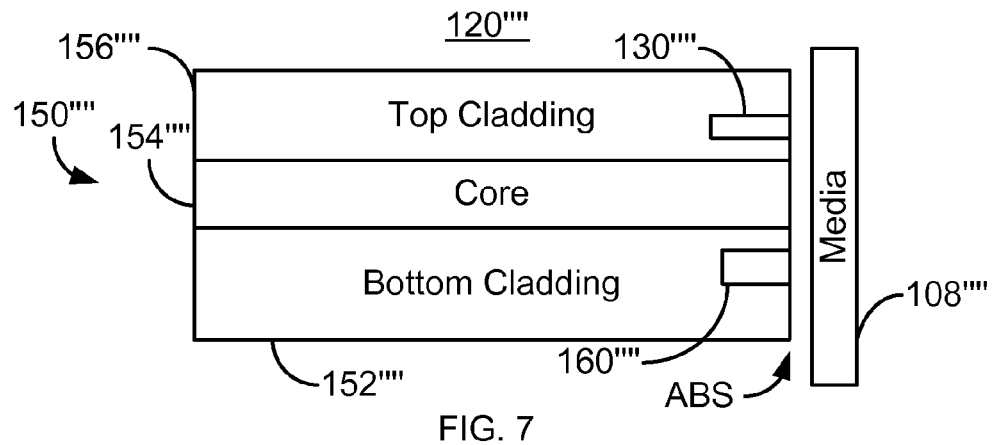
FIG. 7 is a diagram depicting another exemplary embodiment of a waveguide in an embodiment of the EAMR transducer.

FIG. 7 is a diagram depicting an exemplary embodiment of a waveguide 150'''' in an embodiment of the EAMR transducer 120''''. The waveguide 150'''' and EAMR transducer 120'''' are analogous to the waveguide 150 and EAMR transducer 120, respectively. Consequently, analogous components are labeled similarly. The EAMR transducer 120'''' may thus be part of a head and disk drive analogous to the head 110 and disk drive 100, respectively. For simplicity, FIG. 7 is not to scale. In addition, portions of the EAMR transducer 120'''' may be omitted in FIG. 7. For example a grating that may be used to couple light from the laser 104 into the EAMR transducer 120'''' is not shown in FIG. 7. Also shown is recording media 108''''.

Waveguide 150'''' includes core 154'''', bottom cladding 152'''', and top cladding 156''''. The NFT 130'''' is also shown as residing proximate to the core 154''''. In addition, the NFT 130'''' is shown as residing in the top cladding 156''''. The waveguide 150'''' is analogous to the waveguide 150'''. Thus, the mode shift compensator 160'''' is analogous to the mode shift compensator 160'''. However, the mode shift compensator 160''' does not adjoin the core 154''''. Instead, a small portion of the bottom cladding 152'''' resides between the core 154'''' and the mode shift compensator 160''''. However, the waveguide 150'''' still shares the benefits of the waveguide 150'''. In particular, the mode shift compensator 160'''' is configured to compensate for the presence of the NFT 130''''. Consequently, the mode(s) carried by the waveguide 150'''' are better confined to the core 154''''. Thus, the core 154''' may be better able to couple energy from the laser 104 to the NFT 130''''. The optical efficiency of the waveguide 150'''', and thus the EAMR transducer 120'''' may be improved.

Figure 8:
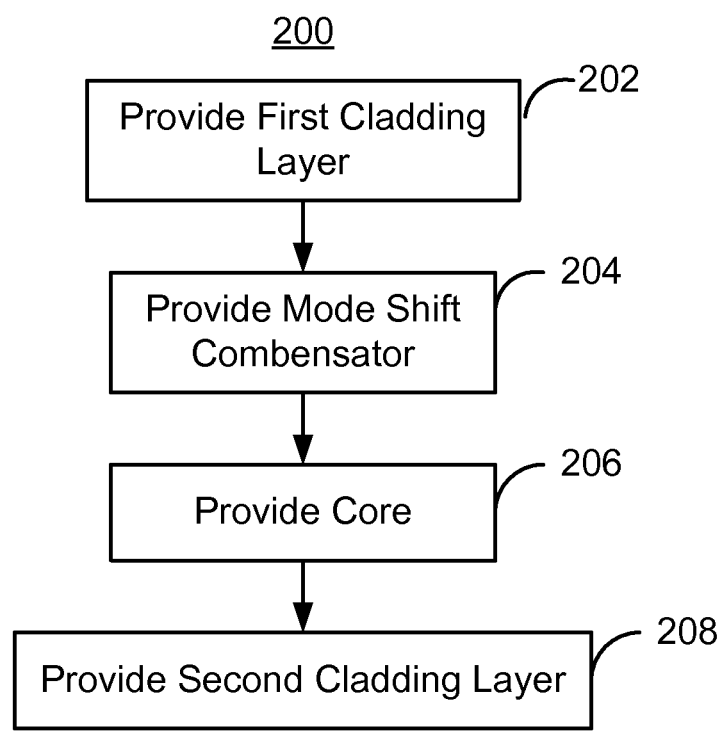
FIG. 8 is a flow chart depicting an exemplary embodiment of a method for fabricating an EAMR transducer.

FIG. 8 depicts an exemplary embodiment of a method 200 of forming a portion of an EAMR head. For simplicity, some steps may be omitted, combined, and/or performed in another sequence. The method 200 is described in the context of the EAMR disk drive 100, EAMR head 110, and EAMR transducer 120. However, the method 200 may be used to fabricate other EAMR heads. In addition, the method 200 is described in the context of fabricating a single disk drive 100. However, multiple transducers may be fabricated substantially in parallel. Further, although described as separate steps, portions of the method 200 may be interleaved.

A first cladding layer 152 is provided. Step 152 may include depositing a dielectric layer, such as aluminum oxide. The mode shift compensator 160 is provided, via step 204. Providing the mode shift compensator 160 may include depositing the desired materials as well as patterning the materials so that the mode shift compensator 160 has the desired shape. For example, a dielectric and/or a metal mode shift compensator 160 may be provided. Further, step 204 may include refilling with the first cladding material prior to the core 154 being formed.

A core 154 configured to direct the energy from the laser 104 toward the ABS is provided, via step 206. Step 206 may include depositing the core material(s) described above as well as patterning the materials, if desired. The second cladding layer 156 is also provided, via step 208. Step 208 may include depositing the material(s) for the second cladding layer 156 on the core 154.

Using the method 200, the EAMR transducers 120, 120', 120", 120''' and/or 120'''' may be obtained. Consequently, the benefits of such devices may be achieved.

We claim:

1. A waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, at least one coil for energizing the write pole, and a near field transducer (NFT) proximate to the ABS for focusing the energy onto the region of the media, the waveguide comprising:

a first cladding layer having a first cladding index of refraction;

a core configured to direct the energy from the laser toward the ABS, the core having a core index of refraction;

a second cladding layer having a second cladding index of refraction, the core residing between the first cladding layer and the second cladding layer; and a mode shift compensator, the core residing between the mode shift compensator and the NFT, the mode shift compensator having a mode shift compensator index of refraction less than the core index of refraction, the mode shift compensator index of refraction being less than the first cladding layer index of refraction and less than the second cladding layer index of refraction.

2. The waveguide of claim 1 wherein the mode shift compensator includes a dielectric layer.

3. The waveguide of claim 2 wherein the core has a length substantially perpendicular to the ABS and wherein the dielectric layer extends substantially along the length of the core.

4. The waveguide of claim 2 wherein the dielectric layer includes at least one of $SiO_2$, $MgF_2$, $CaF_2$, and $BaF_2$.

5. The waveguide of claim 2 wherein the NFT resides in the second cladding layer.

6. The waveguide of claim 2 wherein the mode shift compensator adjoins the core.

7. The waveguide of claim 1 wherein the mode shift compensator includes a metal layer.

8. The waveguide of claim 7 wherein the NFT has an NFT length substantially perpendicular to the ABS and wherein the metal layer extends not farther than the NFT length from the ABS.

9. The waveguide of claim 8 wherein the NFT has a maximum NFT width substantially parallel to the ABS and wherein the metal layer extends not farther than the NFT width along the ABS.

10. The waveguide of claim 7 wherein the metal layer includes at least one of Au, Ag, Cu, and Al.

11. A waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, at least one coil for energizing the write pole, and a near field transducer (NFT) proximate to the ABS for focusing the energy onto the region of the media, the waveguide comprising:

a first cladding layer;

a core configured to direct the energy from the laser toward the ABS, the core having a core index of refraction;

a second cladding layer, the core residing between the first cladding layer and the second cladding layer; and a mode shift compensator, the core residing between the mode shift compensator and the NFT, the mode shift compensator having a mode shift compensator index of refraction less than the core index of refraction;

wherein at least a portion of the second cladding layer resides between the core and the NFT and wherein a portion of the first cladding layer resides between the core and the mode shift compensator.

12. The waveguide of claim 7 wherein the NFT resides in the second cladding layer.

13. The waveguide of claim 1 wherein the core includes at least one of $Ta_2O_5$, $TiO_2$, $Si_3N_4$ and the first and second cladding layers include aluminum oxide.

14. An energy assisted magnetic recording (EAMR) transducer coupled with a laser for providing energy and having an air-bearing surface (ABS) configured to reside in proximity to a media during use, the EAMR transducer comprising:

a write pole configured to write to a region of the media;

at least one coil for energizing the write pole;

a near field transducer (NFT) proximate to the ABS for focusing the energy onto the region of the media;

a waveguide including a first cladding layer having a first cladding index of refraction, a second cladding layer having a second cladding index of refraction, a core, and a mode shift compensator, the core residing between the first cladding layer and the second cladding layer, the core configured to direct the energy from the laser toward the ABS and having a core index of refraction, the core residing between the mode shift compensator and the NFT, the mode shift compensator having a mode shift compensator index of refraction less than the core index of refraction, the mode shift compensator index of refraction being less than the first cladding layer index of refraction and less than the second cladding layer index of refraction, the NFT residing in the second cladding layer.

15. The EAMR transducer of claim 14 wherein the mode shift compensator includes at least one of a dielectric layer and a metal layer.

16. The EAMR transducer of claim 15 wherein the core has a length substantially perpendicular to the ABS, wherein the mode shift compensator includes only the dielectric layer, and wherein the dielectric layer extends substantially along the length of the core.

17. The EAMR transducer of claim 16 wherein the mode shift compensator adjoins the core.

18. The EAMR transducer of claim 16 wherein the dielectric layer includes at least one of $SiO_2$, $MgF_2$, $CaF_2$, and $BaF_2$.

19. The EAMR transducer of claim 15 wherein the mode shift compensator includes the metal layer, wherein the NFT has an NFT length substantially perpendicular to the ABS and a maximum NFT width substantially parallel to the ABS, and wherein the metal layer extends not farther than the NFT length from the ABS and not farther than the NFT width along the ABS.

20. The EAMR transducer of claim 19 wherein the metal layer includes at least one of Au, Ag, Cu, and Al.

21. An energy assisted magnetic recording (EAMR) transducer coupled with a laser for providing energy and having an air-bearing surface (ABS) configured to reside in proximity to a media during use, the EAMR transducer comprising:

a write pole configured to write to a region of the media;

at least one coil for energizing the write pole;

a near field transducer (NFT) proximate to the ABS for focusing the energy onto the region of the media;

a waveguide including a first cladding layer, a second cladding layer, a core, and a mode shift compensator, the core residing between the first cladding layer and the second cladding layer, the core configured to direct the energy from the laser toward the ABS and having a core index of refraction, the core residing between the mode shift compensator and the NFT, the mode shift compensator having a mode shift compensator index of refraction less than the core index of refraction, the NFT residing in the second cladding layer;

wherein at least a portion of the second cladding layer resides between the core and the NFT and wherein at least a portion of the first cladding layer resides between the core and the mode shift compensator.

22. A method for providing a waveguide for use in an energy assisted magnetic recording (EAMR) transducer coupled with a laser for providing energy and having an air-bearing surface (ABS) configured to reside in proximity to a media during use, the EAMR transducer including a write pole configured to write to a region of the media, at least one coil for energizing the write pole, and a near field transducer (NFT) proximate to the ABS for focusing the energy onto the region of the media, the method comprising:

providing a first cladding layer having a first cladding index of refraction;

providing a mode shift compensator having a mode shift compensator index of refraction;

providing a core configured to direct the energy from the laser toward the ABS, the core having a core index of refraction and residing between the mode shift compensator and the NFT, the mode shift compensator index of refraction being less than the core index of refraction;

providing a second cladding layer having a second cladding layer index of refraction, the core residing between the first cladding layer and the second cladding layer, the mode shift compensator index of refraction being less than the first cladding layer index of refraction and less than the second cladding layer index of refraction.

23. The method of claim 22 wherein the step of providing the mode shift compensator further includes:

providing at least one of a dielectric layer and a metal layer.

24. The method of claim 23 wherein the step of providing the first cladding layer includes:

providing the first cladding layer having a first cladding index of refraction, wherein the step of providing the second cladding layer includes:

providing the second cladding layer having a second cladding index of refraction; and wherein the mode shift compensator index of refraction is less than the first cladding layer index of refraction and the second cladding layer index of refraction.

* * * * *